United States Patent
Nelson et al.

(10) Patent No.: US 8,677,686 B1
(45) Date of Patent: Mar. 25, 2014

(54) HIGH-PRODUCTION, MINIMAL-DISCHARGE AQUAPONIC SYSTEMS AND METHODS

(75) Inventors: Rebecca L. Nelson, Montello, WI (US); John S. Pade, Montello, WI (US)

(73) Assignee: Nelson and Pade, Inc., Montello, WI (US)

( * ) Notice: Subject to any disclaimer, the term of this patent is extended or adjusted under 35 U.S.C. 154(b) by 182 days.

(21) Appl. No.: 13/414,423

(22) Filed: Mar. 7, 2012

Related U.S. Application Data

(60) Provisional application No. 61/468,926, filed on Mar. 29, 2011.

(51) Int. Cl.
*A01G 31/00* (2006.01)

(52) U.S. Cl.
USPC .......................................... 47/62 R

(58) Field of Classification Search
USPC ................... 47/59 R, 62 R; 119/227, 260
See application file for complete search history.

(56) References Cited

U.S. PATENT DOCUMENTS

| | | |
|---|---|---|
| 2009/0301399 A1 | 12/2009 | Brown et al. |
| 2010/0031893 A1 | 2/2010 | Bodlovich et al. |

*Primary Examiner* — Monica Williams
(74) *Attorney, Agent, or Firm* — Joseph T. Leone, Esq.; DeWitt Ross & Stevens S.C.

(57) ABSTRACT

High-production, minimal-discharge aquaponic systems and methods. The aquaponic systems separate waste water generated from fish tanks into two flow streams. In the first flow stream, suspended-waste water generated from the waste water is converted to nutrient-rich water and used for hydroponic plant growth. Nutrient-depleted water resulting from the hydroponic plant growth is fed back into fish tanks to continue the cycle. In the second flow stream, settleable solids generated from the waste water is converted to nutrient-rich sludge and used for solid or semi-solid substrate-based plant growth. Excess nutrient-rich water derived from the second flow stream is fed back into the first flow stream, thereby conserving water and nutrients within the system.

14 Claims, 2 Drawing Sheets

HIGH-PRODUCTION, MINIMAL-DISCHARGE AQUAPONIC SYSTEMS AND METHODS

CROSS-REFERENCE TO RELATED APPLICATIONS

This application claims priority under 35 USC §119(e) to U.S. Provisional Patent Application 61/468,926 filed Mar. 29, 2011, the entirety of which is incorporated herein by reference.

FIELD OF THE INVENTION

This invention is directed to aquaponic systems and methods.

BACKGROUND

Aquaponics is a sustainable method of food production that combines aquaculture (fish farming) with hydroponic plant production. The main method of aquaponics that is used in aquaponic food production is the raft system, which was primarily developed at the Agriculture Experiment Station, University of the Virgin Islands over a 30 year period.

Conventional aquaponic systems typically include multiple fish tanks, raft tanks in which the plants are grown, and basic filtration components. Examples of conventional aquaponic systems are described in U.S. Pat. Pub. 2010/0031893 to Bodlovich et al. and U.S. Pat. Pub. 2009/0301399 to Brown et al. Nitrification, a process that generates nitrogen, is conventionally performed directly in the raft tanks. Conventional aquaponic raft systems typically produce daily discharge of water and fish waste. This discharge discards material that could otherwise be used to increase plant production.

There is a need for an aquaponic system that nearly eliminates the water and waste discharge associated with conventional aquaponic systems and increases plant production.

SUMMARY OF THE INVENTION

The invention described herein includes aquaponic systems and methods that address the aforementioned needs.

One version of the invention is an aquaponic system that includes a solids separator configured to accept waste water and separate settleable solids from suspended-waste water, a first component configured to receive the suspended-waste water and convert the suspended-waste water to nutrient-rich water suitable for hydroponic plant growth, a hydroponic growth apparatus configured to receive the nutrient-rich water for supporting hydroponic growth and to convert the nutrient-rich water to nutrient-depleted water, a fish tank configured to receive the nutrient-depleted water and convert the nutrient-depleted water to the waste water, and a second component configured to receive the settleable solids and convert the settleable solids to nutrient-rich sludge.

The first component preferably comprises a nutrification tank configured to convert the suspended-waste water to mineralized water, a nitrification tank configured to convert mineralized water to nitrified water, and a degassing tank configured to convert the nitrified water to the nutrient-rich water.

The hydroponic growth apparatus preferably comprises an apparatus selected from the group consisting of a hydroponic raft tank and a nutrient film technique apparatus.

The second component preferably comprises a solids filter configured to collect and process the settleable solids and to generate nutrient-rich filtrate water and the nutrient-rich sludge from the processed settleable solids, wherein the nutrient-rich filtrate water is preferably delivered back to the first component.

The system preferably further includes a substrate-based growth apparatus configured to receive the nutrient-rich sludge for supporting plant growth. The substrate-based growth apparatus is preferably a soilless media-filled growth bed.

The system also preferably further includes a sludge sump configured to receive nutrient-rich sludge from the second component and nutrient-depleted sludge from the substrate-based growth apparatus to generate a mixture, wherein the mixture is delivered to the substrate-based growth apparatus to support plant growth.

Another version of the invention is an aquaponic method that includes the steps of separating waste water into settleable solids and suspended-waste water, converting the suspended-waste water to nutrient-rich water suitable for hydroponic plant growth, growing plants in a hydroponic growth apparatus with the nutrient-rich water wherein the growing includes converting the nutrient-rich water to nutrient-depleted water, converting the nutrient-depleted water to the waste water, and converting the settleable solids to nutrient-rich sludge.

The step of converting the suspended-waste water to the nutrient-rich water preferably comprises sequentially converting the suspended-waste water to mineralized water comprising ammonia while controlling denitrification, converting the mineralized water to nitrified water by converting ammonia to nitrate, and converting the nitrified water to the nutrient-rich water by removing gasses from the nitrified water.

The step of growing the plants in the hydroponic growth apparatus preferably comprises a step selected from the group consisting of growing the plants in a hydroponic raft tank and growing the plants in a nutrient film technique apparatus.

The step of converting the settleable solids to nutrient-rich sludge preferably comprises filtering the settleable solids to generate nutrient-rich filtrate water, wherein the method further comprises converting the nutrient-rich filtrate water to the nutrient-rich water used for growing the plants in the hydroponic growth apparatus.

The method preferably further includes a step of growing plants in a substrate-based growth apparatus, such as a soilless media-filled growth bed, with the nutrient-rich sludge.

The method preferably further includes steps of mixing nutrient-depleted sludge resulting from plant growth in the substrate-based growth apparatus with the nutrient rich sludge to generate a mixture, and delivering the mixture to the soilless media-filled growth bed.

The aquaponic systems and methods described herein nearly eliminate the water and waste discharge associated with conventional aquaponic systems and drastically increase the plant production compared to those systems. The system components fully use all fish waste as fertilizer for plant growth and allow integration of leafy and fruiting crops in one system. The components also allow the grower to manipulate the ratios of nitrogen to other elements in the solution, optimizing plant growth and quality. The increased nutrient availability also allows new planting and spacing methods, further increasing plant production.

The aquaponic systems and methods described herein move aquaponics from a concept that is being applied on a small scale to one that can produce mass amounts of food (protein and vegetables) for commercial ventures and for feeding the hungry and the growing global population.

The aquaponic systems and methods described herein enhance biological activities including nitrification, which generates nitrogen, and nutrification, which generates other elements needed for plant growth, resulting in a clear, highly mineralized nutrient solution for the plants and a clean system with nearly zero discharge. Nutrient-rich water processed from waste-water suspensions is delivered to hydroponic growth apparatuses to increase production. Solid fish wastes are captured, processed, and utilized in additional plant culture systems, diversifying crops and further increasing crop production.

The objects and advantages of the invention will appear more fully from the following detailed description of the preferred embodiment of the invention made in conjunction with the accompanying drawings.

DETAILED DESCRIPTION OF THE INVENTION

Figure 1:
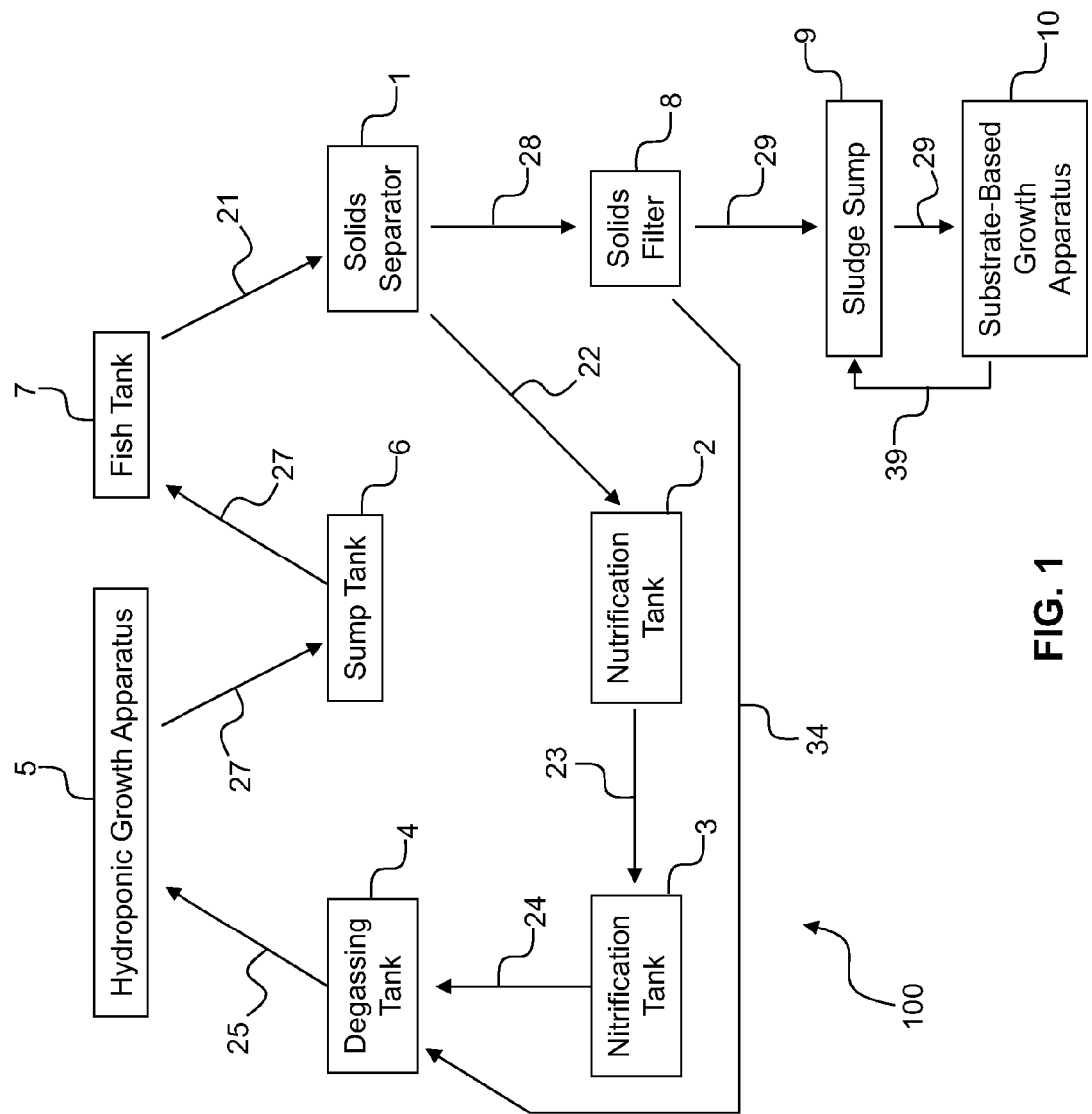
FIG. 1 depicts a schema of an exemplary aquaponic system of the present invention.

The aquaponic systems of the present invention may include various combinations of elements selected from the group consisting of a solids separator 1, a nutrification tank 2, a nitrification tank 3, a degassing tank 4, any of a variety of hydroponic growth apparatuses 5 such as a hydroponic raft tank 51 and/or a nutrient film technique apparatus 52, a sump tank 6, a fish tank 7, a solids filter 8, a sludge sump 9, and a substrate-based growth apparatus 10. An exemplary aquaponic system 100 of the present invention is provided in FIG. 1.

The solids separator 1 treats fish waste water 21 received from fish tanks 7 by separating settleable solids 28 from suspended-waste water 22. "Settleable solids" refers to particulates that are capable of settling out of the waste water 21. "Suspended-waste water" refers to the water residue remaining after removal of settleable solids, and includes fish-waste particulates not capable of settling out of the waste water 21 suspended therein. Various solids separators are known in the art. Non-limiting examples of suitable solids separators 1 include clarifiers, swirl separators, Imhoff tanks or cones, etc. In preferred versions, the solids separator 1 is a non-filtration solids separator.

The nutrification tank 2 is a multi-staged tank or set of tanks that provide habitat for heterotrophic bacteria to mineralize the suspended fish waste in the suspended-waste water 22 into usable nutrients for the fish, thereby generating mineralized water 23. The term "mineralize" is used herein as in the art and refers to the break-down of solid, organic waste material (fecal material from fish) to carbon dioxide, ammonia, and other compounds and components. By design, these tanks enhance removal of organic materials and control denitrification (i.e., the conversion (reduction) of nitrites and nitrate to gaseous nitrogen ($N_2$, NO, $N_2O$)). Mineralization is accomplished by any of a number of species of heterotrophic bacteria known in the art. Heterotrophic bacteria can be either gram-positive (e.g., *Bacillus*) or gram-negative (e.g., *Pseudomonas, Escherichia*). Some are strictly aerobic, but many are facultative anaerobes (they can survive in both the presence and absence of oxygen). Many species tolerate a wide range of environmental conditions, including temperature, pH, salinity, etc.

The nitrification tank 3 provides habitat for nitrifying bacteria to convert the mineralized water 23 to nitrified water 24. The nitrifying bacteria perform nitrification, the biological oxidation of ammonia to nitrite and then nitrate. Nitrate is the primary form of nitrogen used by plants. The nitrification process consists of two steps: (1) Oxidation of ammonia ($NH_3$) to nitrite ($NO_2$); and (2) Oxidation of nitrite ($NO_2$) to nitrate ($NO_3$). Five genera are generally accepted as ammonia oxidizers and four genera as nitrite oxidizers. Of these, *Nitrosomonas* (ammonia oxidizers) and *Nitrobacter* (nitrite oxidizers) are the most important. The sustained growth of nitrifying bacteria is a function of several parameters. Nitrifying bacteria are aerobic bacteria. This means they require dissolved oxygen in order to metabolize, grow, and reproduce. Sufficient alkalinity is also important. Alkalinity of water is a measure of its capacity to neutralize acids. A variety of compounds, including bicarbonates, salts of weak acids, and hydroxides contribute to alkalinity. When ammonia is oxidized during nitrification, protons (H+) are liberated. Alkalinity is needed to neutralize these protons. In fact, 8.64 mg/l of alkalinity are consumed for each mg/l of ammonia that is oxidized. Without sufficient alkalinity, the pH will drop, and nitrification will slow down or even stop. Nitrification works best when the pH is between 6.5 and 8.5. The process slows considerably at pH values outside this range. Optimal temperature is also important, as extreme temperatures can impair nitrification efficiency.

The degassing tank 4 is configured to remove gasses dissolved in the water in the system 100, such as nitrified water 24 and/or nutrient-rich filtrate water 34, thereby generating nutrient-rich water 25 suitable for sustaining hydroponic growth. The gasses are introduced into the water as a result of the biological processes that generate nutrients, such as those involved in the nutrification and nitrification steps. Various degassing tanks are well-known in the art and are suitable for use in the present system 100.

Figure 2:
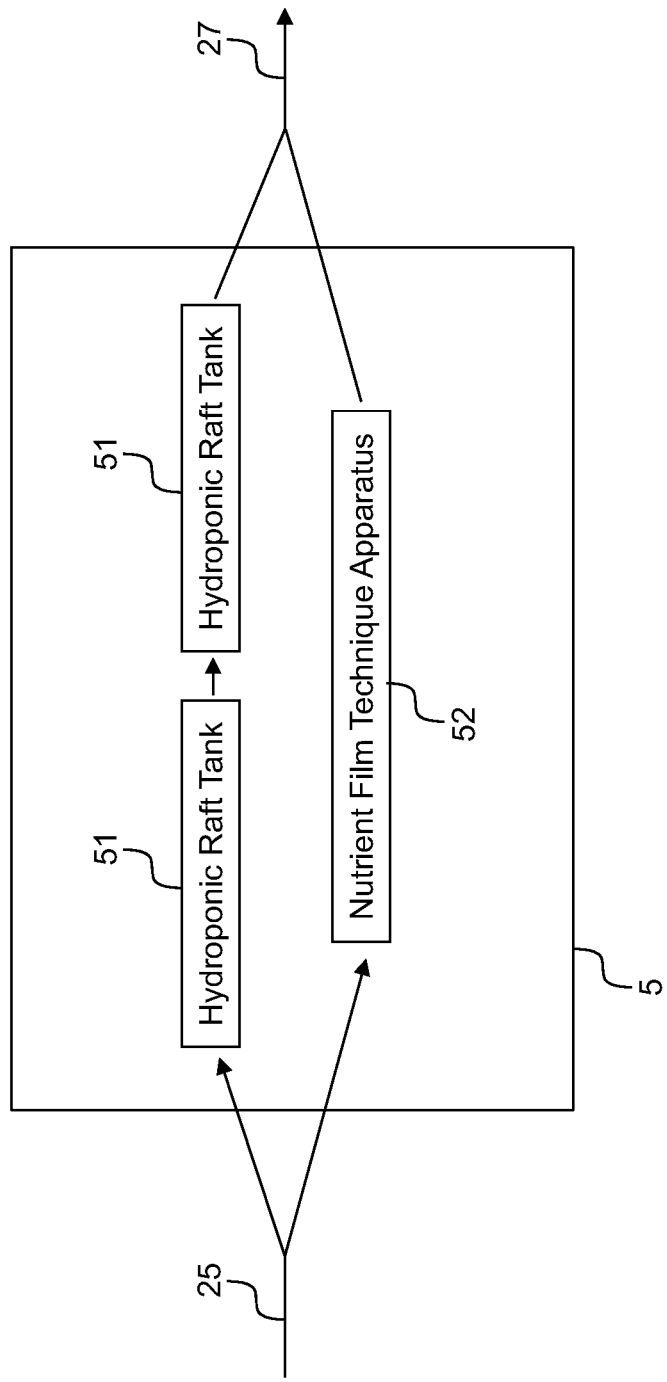
FIG. 2 depicts a schema of an exemplary hydroponic growth apparatus of the present invention.

The hydroponic growth apparatus 5 may comprise any apparatus or group of apparatuses configured for supporting hydroponic growth. As shown in FIGS. 1 and 2, two exemplary apparatuses suitable for inclusion in the hydroponic growth apparatus 5 include hydroponic raft tanks 51 and nutrient film technique (NFT) apparatuses 52. In the process of supporting hydroponic growth, the hydroponic growth apparatus 5 converts the nutrient-rich water 25 to nutrient-depleted water 27.

Hydroponic raft tanks 51 generally comprise a tank of water with a water inlet and a water outlet and hydroponic rafts floating on or suspended above the water. The hydroponic rafts are generally made from construction grade polystyrene sheets and comprise holes with various pots contained therein. Non-limiting examples of suitable pots include hydroponic net pots, horticultural horticubes, and rockwool cubes. Plants are grown in the pots in such a manner that their roots extend to and within the water.

NFT apparatuses 52 generally comprise water channels, preferably sloping channels; a table frame to support the channels; water inlets and outlets on either side of the channels; and, in some cases, a reservoir for capturing water from the channels and recirculating the water to the channels before returning the water back to other components of the system 100. A very shallow stream of water containing dissolved nutrients is circulated past the bare roots of plants in the channels, the latter of which constitute watertight gullies. The depth of the recirculating stream is very shallow, with little more than a film of water, thereby forming a "nutrient film." A thick root mat develops in the bottom of the channel and has an upper surface, which, although moist, is exposed to the air. NFT apparatuses 52 are exceptional for exposing plants to adequate supplies of water, oxygen, and nutrients. NFT apparatuses 52 are useful for growing leafy crops such as lettuce and herbs.

A preferred configuration for the hydroponic growth apparatus 5, shown in FIG. 2, includes one NFT apparatus 52 and two hydroponic raft tanks 51. The NFT apparatus 52 is configured in parallel with respect to the hydroponic raft tanks 51, and the hydroponic raft tanks 51 are configured in series with respect to each other. An excess of hydroponic raft tanks 51 included within a system may require diluting the water in the system with "make-up" water from outside the system, which decreases nutrient availability to all plants. Inclusion of NFT apparatuses 52 increases plant production without diluting the water in the system or affecting the ratio of water to fish within the system 100.

The sump tank 6 serves as a reservoir for the system 100. In the preferred version, it is disposed between the hydroponic growth apparatus 5 and the fish tank 7 to store the nutrient-depleted water. However, the sump tank 6 may be disposed between any two components involved in the first flow path, described in detail below.

The fish tank 7 receives nutrient-depleted water 27 and houses fish therein. In so doing, the nutrient-depleted water 27 is converted to waste water 21.

The solids filter 8 collects, processes, and blends settleable solids 28, such as those received from the solids separator 1. Such settleable solids 28 would not be used in a conventional raft system. The solids filter 8 also filters the processed and blended settleable solids 28 to generate clear, nutrient-rich filtrate water 34 and nutrient-rich sludge 29 as a retentate. The solids filter 8 preferably includes a filtration tank, a bead filter, a pump to run the filter, and appropriate plumbing for carrying out the above-mentioned processes. Collection and subsequent use of the nutrient-rich sludge 29 and return of the nutrient-rich filtrate water 34 to the first flow path, as described below, results in nearly zero waste and at least doubles the plant production compared to conventional aquaponic systems.

The sludge sump 9 is a reservoir for the nutrient-rich sludge 29 generated by the solids filter 8. The nutrient-rich sludge 29 can be pumped from the sludge sump 9 to various substrate-based growth apparatuses 10 for use as fertilizer. The sludge sump 9 includes a sump tank, a pump for pumping the sludge from the sump tank, and appropriate plumbing. As nutrient-rich sludge 29 in the sludge sump 9 is preferably configured not to return to the hydroponic growth apparatus 5 in the first flow path (see FIG. 1), adjustments to the pH and/or nutrient composition can be made in the sludge sump 9 to accommodate specific crop needs in the substrate-based growth apparatuses 10.

The substrate-based growth apparatus 10 includes one or more apparatuses configured to grow plants in a solid or semi-solid substrate. Various non-limiting examples of substrate-based growth apparatuses 10 include soilless media-filled growth beds and soil-filled growth beds. The beds may be contained indoors or outdoors and may be raised beds or in-ground beds.

A preferred substrate-based growth apparatus 10 includes raised, soilless media-filled growth beds that include a frame, a liner, a soilless medium, aeration, and plumbing. The frame is covered with a liner and is filled with a soilless medium, such as expanded clay. Nutrient-rich sludge, such as from the sludge sump 9, is pumped into the media bed and distributed throughout the bed. The sludge is very rich in nutrients and is further broken down by microbes through the mineralization process to release more nutrients over time. Aeration that runs the length of the bottom of the media bed enhances this microbial activity. Indoor, soilless media-filled growth beds are preferred for growing fruiting crops such as tomatoes, peppers, beans, squash, etc.

As shown in FIG. 1, the components of the system 100 described above are preferably configured in two main flow paths. A first flow path generates nutrient-rich water 25 from nutrient-depleted water 27 for use by the hydroponic growth apparatus 5. The second flow path generates nutrient-rich sludge for use as fertilizer, for example, by the substrate-based growth apparatus 10.

In the first flow path, nutrient-depleted water 27 stored in the sump tank 6 is pumped to the fish tank 7. In the fish tank 7, the nutrient-depleted water 27 becomes replete with fish waste and flows to the solids separator 1 as waste water 21. The solids separator 1 separates the waste water 21 into settleable solids 28 and suspended-waste water 22. The settleable solids 28 are sent to the second flow path, described below. The suspended-waste water 22 flows to the nutrification tank 2 to generate mineralized water 23. The mineralized water 23 flows to the nitrification tank 3 to generate nitrified water 24. The nitrified water 24 flows to the degassing tank 4 to generate nutrient-rich water 25. From there, the nutrient-rich water 25 is transported to the hydroponic growth apparatus 5 to support plant growth. In the process of supporting plant growth, the nutrient-rich water 25 becomes nutrient-depleted water 27, the latter of which flows back to the sump tank 6 for storage.

In a second flow path, the settleable solids 28 separated in the solids separator 1 flow to the solids filter 8. The settleable solids 28 may contain just enough water required to move them through the system 100. However, the amount of water in the settleable solids 28 can be varied depending on how much water is needed in the downstream substrate-based growth apparatuses 10. The settleable solids 28 in the solids filter 8 are preferably mixed with water draining from the nutrification tank 2 and nitrification tank 3 (path not shown). The settleable solids 28 are processed in the solids filter 8, and nutrient-rich sludge 29 and nutrient-rich filtrate water 34 are separated by filtration. The nutrient-rich filtrate water 34 is transferred to a component of the first flow path, such as the nutrification tank 2, nitrification tank 3, or, preferably, the degassing tank 4 (see FIG. 1). Transferring the nutrient-rich filtrate water 34 back to the first flow path makes additional water and nutrients available to the hydroponic growth apparatus 5 for increased plant production and reduces the amount of make-up water required in the system 100. The nutrient-rich sludge 29 is pumped to the sludge sump 9 and then the substrate-based growth apparatus 10, where heterotrophic bacteria further process it to release nutrients, thereby supporting additional plant growth. If a soilless media-filled growth bed is employed as a substrate-based growth apparatus 10, nutrient-depleted sludge 39 is preferably recycled from the substrate-based growth apparatus 10 back to the sludge sump 9 and mixed with the nutrient-rich sludge 29 entering from the solids filter 8. As an alternative to or in addition to using the nutrient-rich sludge 29 as fertilizer on-site in a substrate-based growth apparatus 10, the nutrient-rich sludge 29 may be packaged and sent off-site for use as fertilizer.

Pumps are preferably disposed throughout the system 100 to promote flow in the two flow streams. A pump may be operationally connected to the sump tank 6 for pumping nutrient-depleted water 27 to the fish tank 7. Another pump may be operationally connected to degassing tank 4 to deliver nutrient-rich water 25 to the NFT apparatus 52. Another pump may be operationally disposed within the solids filter 8 to drive filtration. Yet another pump may be operationally connected with the sludge sump 9 to pump the nutrient-rich sludge 29 therefrom. The materials (water and sludge) in the system 100 otherwise travels throughout the system 100 by gravity flow.

The system 100 may include one or more of any of the elements described herein. If more than one of a particular element is included, the elements may be connected in series or in parallel. A preferred version includes four fish tanks 5; four solids separators 1, each fed by a corresponding one of the four fish tanks 5; two nutrification tanks 2 disposed in series; one nitrification tank 3; a degassing tank 4 with separate, parallel outlets to each of a hydroponic raft tank 51 and an NFT apparatus 52; a hydroponic growth apparatus 5 comprising two hydroponic raft tanks 51 mutually disposed in series and disposed in parallel with an NFT apparatus 52; one sump tank 5; one sludge sump 9; and two, parallel substrate-based growth apparatuses 10 independently connected to the sludge sump 9 to recycle sludge therebetween.

In a conventional aquaponic system, any settleable solids and associated water would be discarded. By contrast, the aquaponic system 100 described herein eliminates waste and retains water and nutrients within the system 100 without diluting the water by adding extra, fresh makeup water. The use of the two streams, as well as the feedback from the second flow stream to the first, provides at least double the plant production compared to conventional aquaponic systems. In a convention raft aquaponic system, the plant-to-fish production ratio is about 10-to-1. With the system 100 described herein, the plant to fish production ratio can be about 20-to-1.

The elements and method steps described herein can be used in any combination whether explicitly described or not. All combinations of method steps as described herein can be performed in any order, unless otherwise specified or clearly implied to the contrary by the context in which the referenced combination is made.

As used herein, the singular forms "a," "an," and "the" include plural referents unless the content clearly dictates otherwise. For example, reference to "a substrate-based growth apparatus" may include one, two, three, or more substrate-based growth apparatuses.

All patents and patent publications cited herein are expressly incorporated by reference to the same extent as if each were specifically and individually indicated as being incorporated by reference. In case of conflict between the present disclosure and the incorporated references, the present disclosure controls.

It is understood that the invention is not confined to the particular construction and arrangement of parts herein illustrated and described, but embraces such modified forms thereof as come within the scope of the following claims.

We claim:

1. An aquaponic system comprising:
    a solids separator configured to receive waste water and separate the waste water into settleable solids and suspended-waste water;
    a first component configured to receive the suspended-waste water and convert the suspended-waste water to nutrient-rich water suitable for hydroponic plant growth, wherein the first component comprises, in series, a nutrification tank configured to convert the suspended-waste water to mineralized water, a nitrification tank configured to convert mineralized water to nitrified water, and a degassing tank configured to convert the nitrified water to the nutrient-rich water;
    a hydroponic growth apparatus configured to receive the nutrient-rich water, to support hydroponic growth, and to convert the nutrient-rich water to nutrient-depleted water;
    a fish tank configured to receive the nutrient-depleted water and convert the nutrient-depleted water to the waste water;
    a second component configured to receive the settleable solids and convert the settleable solids to nutrient-rich sludge;
    a substrate based growth apparatus configured to receive the nutrient-rich sludge for supporting plant growth, wherein the substrate-based growth apparatus is a soilless media-filled growth bed; and
    a sludge sump configured to receive nutrient-rich sludge from the second component and nutrient-depleted sludge from the substrate-based growth apparatus to generate a mixture, and to deliver the mixture to the substrate-based growth apparatus.

2. The system of claim 1 wherein the first component comprises a nutrification tank configured to mineralize the suspended-waste water, generate ammonia, and control denitrification.

3. The system of claim 1 wherein the first component comprises a nitrification tank configured to perform nitrification.

4. The system of claim 1 wherein the first component comprises a degassing tank.

5. The system of claim 1 wherein the hydroponic growth apparatus comprises an apparatus selected from the group consisting of a hydroponic raft tank and a nutrient film technique apparatus.

6. The system of claim 1 wherein the hydroponic growth apparatus comprises at least two hydroponic raft tanks mutually configured in series and together configured in parallel with a nutrient film technique apparatus.

7. The system of claim 1 wherein the second component comprises a solids filter configured to collect and process the settleable solids and to generate the nutrient-rich sludge from the settleable solids.

8. The system of claim 1 wherein the second component comprises a solids filter configured to generate nutrient-rich filtrate water from the settleable solids and deliver the nutrient-rich filtrate water to the first component.

9. The system of claim 1 wherein the second component comprises a solids filter configured to receive water draining from the first component.

10. An aquaponic method comprising:
    separating waste water into settleable solids and suspended-waste water;
    converting the suspended-waste water to nutrient-rich water suitable for hydroponic plant growth, wherein the converting the suspended-waste water to the nutrient-rich water comprises, sequentially:
        converting the suspended-waste water to mineralized water comprising ammonia while controlling denitrification;
        converting the mineralized water to nitrified water, comprising converting the ammonia to nitrate through nitrification; and
        converting the nitrified water to the nutrient-rich water by removing classes from the nitrified water;
    growing plants in a hydroponic growth apparatus with the nutrient-rich water, wherein the growing includes converting the nutrient-rich water to nutrient-depleted water;

converting the nutrient-depleted water to the waste water; and converting the settleable solids to nutrient-rich sludge, wherein the converting the settleable solids to the nutrient-rich sludge comprises filtering the settleable solids to generate nutrient-rich filtrate water, and further comprising converting the nutrient-rich filtrate water to the nutrient-rich water used for the growing the plants in the hydroponic growth apparatus.

11. The method of claim 10 wherein the growing the plants in the hydroponic growth apparatus comprises a step selected from the group consisting of growing the plants in a hydroponic raft tank and growing the plants in a nutrient film technique apparatus.

12. The method of claim 10 further comprising growing plants in a substrate-based growth apparatus with the nutrient-rich sludge.

13. The method of claim 10 further comprising growing plants in a soilless media-filled growth bed with the nutrient-rich sludge.

14. The method of claim 13 wherein the growing the plants in the soilless media-filled growth bed comprises converting the nutrient-rich sludge to nutrient-depleted sludge, and further comprising mixing the nutrient-depleted sludge with the nutrient rich sludge to generate a mixture and delivering the mixture to the soilless media-filled growth bed.

* * * * *